UNITED STATES PATENT OFFICE.

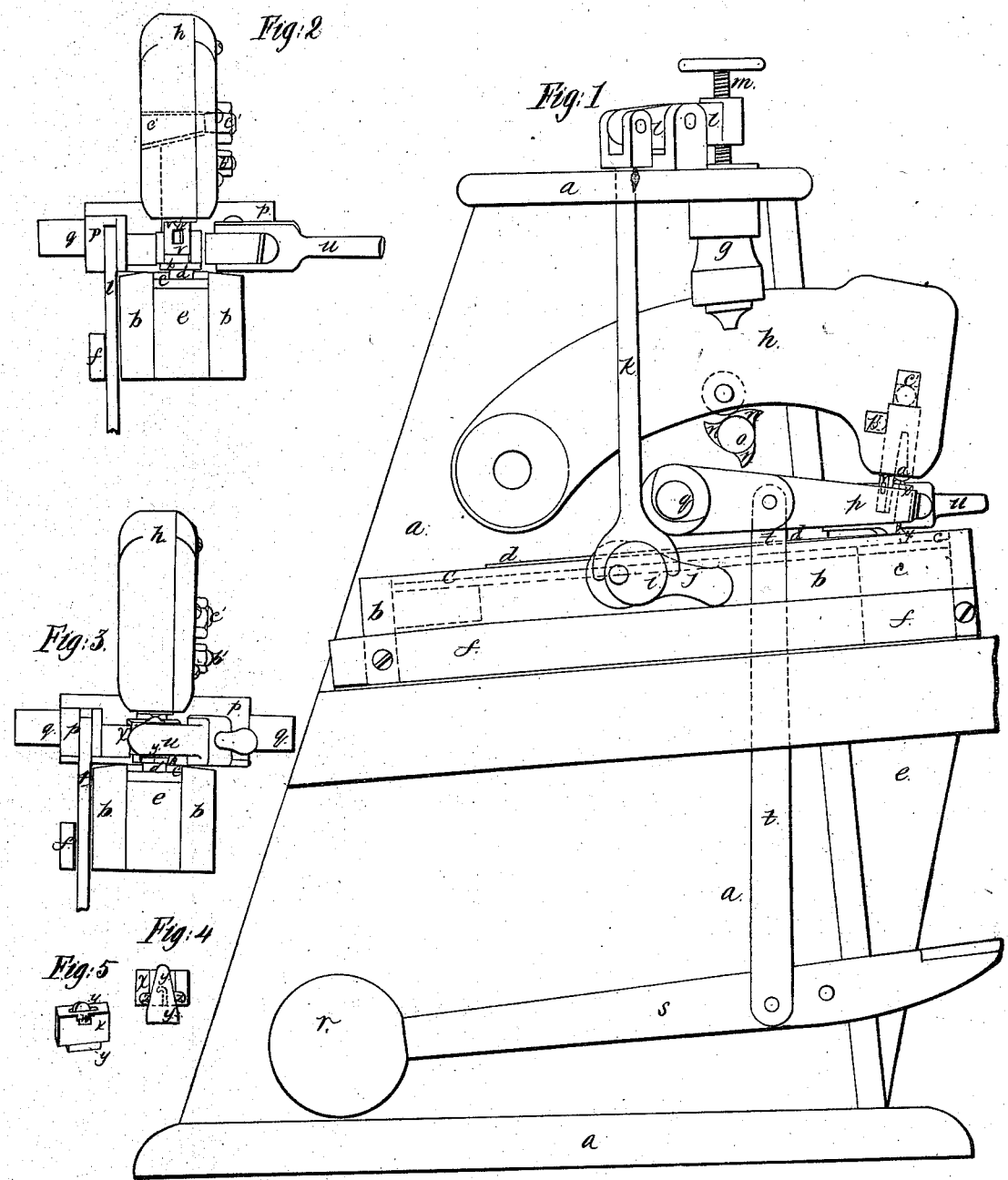

JAMES DODGE, OF MANCHESTER, COUNTY OF LANCASTER, ENGLAND, ASSIGNOR TO DAVID BLAKE, OF SPENCERTOWN, NEW YORK.

IMPROVEMENT IN MACHINES FOR CUTTING FILES.

Specification forming part of Letters Patent No. 112,430, dated March 7, 1871.

*To all whom it may concern:*

Be it known that I, JAMES DODGE, of Manchester, in the county of Lancaster, England, have invented Improvements in File-Cutting Machines; and I do hereby declare that the following, taken in connection with the drawings which accompany and form part of this specification, is a description of my invention sufficient to enable those skilled in the art to practice it.

This invention relates to improvements in that class of file-cutting machines in which a chisel is held by a special holder, and is struck by a falling weight or hammer, instead of being fixed to the hammer or weight and moving therewith the entire distance traversed to give the blow.

In my machine I make use of a presser which bears upon the file-blank constantly during the process of cutting, and the plain extremity of which supports and guides the cutter. In the free end of this presser provision is made for a movable carrier of the cutter, said carrier being capable of being moved up and down in the presser-arm through a connection with the hammer, which admits of a slight relative movement between the carrier and the hammer. All the boundaries of the space in which the carrier is moved are formed by the body of the presser-bar, except one, which is formed by the short arm of a bent lever pivoted to the presser-bar, said short arm being faced with rubber or yielding material, and being capable of moving as a gate on its pivot to allow removal of the cutter-carrier. The cutter is placed in a mortise in said carrier, the cutter fitting the thickness of the mortise, but not its ends, between which and the edges of the cutter there is interposed rubber, to permit movement of the carrier relative to the cutter, such movement compressing the rubber and forcing the edge of the chisel or cutter upon the face of the blank with a yielding pressure. The chisel is held in its place in the carrier by a pin, which enters but does not fill an angular slot in one face of the mortise in the carrier and prevents the chisel from dropping out of the carrier, as both are raised above the blank. The hammer-head is connected to the carrier by a piece fitted as a slide in the head, capable of adjustment therein by means of wedges operated by screws and nuts thereon, the lower end of the slide being slotted, so as loosely to embrace a pin on the carrier.

With this general description the points of novelty in my invention will be easily understood, and they may be stated as consisting in the means provided for steadying the presser upon the blank and elevating the same therefrom when desired also in the manner of mounting the cutter in the carrier containing springs and located in the presser; also, in the manner of connecting the carrier with the device which gives the blow; also, in the manner of inclosing the carrier in the presser; also, in the means provided for adjusting the connection of the blow-giver with the carrier as the cutter wears by use; also, in the means used to adjust the force of the blow of the blow-giver.

Of the drawings, Figure 1 shows in side elevation so much of a file-cutting machine as is needed to illustrate the embodiment of my invention, one side of the frame being represented as removed to let the parts be seen. Fig. 2 is a view showing the end of the presser-foot, with the carrier of the cutter removed therefrom to exhibit the piece in elevation which connects the hammer-head and carrier. Fig. 3 is a view similar to Fig. 2, except that it shows the carrier and cutter in position, ready for action. Fig. 4 shows a sectional view of the carrier with the chisel in place therein; and Fig. 5 is a perspective view of the carrier and cutter combined.

The file-blank is mounted in or on a bed which rests on an anvil, the file-bed being carried by a frame in which said bed fits, the frame being fed along by a screw, as in other well-known file-cutting machines. The blow-giving device shown is a small trip-hammer, though it might be a drop-weight. Said hammer or weight is raised against the action of a spring by the operation of tappets on a rotating shaft, while the expansion of the spring after compression acts in aid of gravity to throw down the hammer-head or weight, as in other well-known machines. Means are also shown as provided for increasing or diminishing the action of the spring automatically as the file passes under the cutter to modify the force of the blow in conformity to the width of the file. In this there is nothing novel except my specific combination and arrangement of devices.

The frame of the machine is marked $a$. The moving frame surrounding and carrying the file-bed is marked $b$, while $c$ denotes said bed; $d$, the file-blank; $e$, the anvil, and $f$ the pattern, which is carried by the frame which operates to alter the stress of the spring $g$, which reacts on the hammer-helve $h$.

Pivoted in the frame $a$ is an eccentric, $i$, having an arm, $j$, one end of which rests on the pattern $f$, so that as the pattern moves the arm $j$ partially turns the eccentric $i$, causing movement of the connection $k$, which, through the lever $l$, operates on spring $g$ to compress it or to relieve it from compression, according as the arm $j$ is raised or lowered by the operation of the pattern $f$.

In one end of arm $l$ is a screw, $m$, by which the operator may adjust the tension of spring $g$.

The tappets, which operate on a friction-roll in the hammer-helve, are marked $n$, and are fixed on the rotating shaft $o$.

The spring $g$ is made of vulcanized rubber.

The presser $p$ is made as a lever, with its free end provided with a projection adapted to bear fairly on the face of the file-blank, the end of said projection being a plane surface in the plane of the flat surface of the chisel and on an angle across the file-blank corresponding with the angle at which the teeth of the file are cut across the blank. The presser-lever is pivoted at $q$, and is held down on the blank by action of weight $r$, acting through lever $s$ and link $t$, lever $s$ being also arranged as a treadle, so that by the action of the foot thereupon the presser may be raised from the file-blank. In the presser end are formed three sides of a rectangular mortise, the fourth side being completed by the short arm of bent lever $u$, which is pivoted to the presser-foot, so that the mortise can be easily opened or closed by change in the position of the short arm of the lever $u$.

At the rear of the mortise the material of the presser-arm is removed to admit of movement of a piece, $v$, which is fastened in the hammer-head so as to be capable of adjustment therein. In this piece $v$, where it projects below the hammer-head, is a slot, which surrounds a projection, $w$, from the carrier $x$, which is capable of sliding in the mortise of which short arm of lever $u$ forms one side. The slot in $v$ is larger than the size of projection $w$, so that the hammer-head is permitted some movement not imparted to the carrier, which excess of movement it is that operates to give the blow to the chisel contained in the carrier. The carrier is mortised through to fit the thickness of the cutter $y$, the width of the mortise being in excess of the width of the cutter, and there being inserted between the ends of the mortise and the edges of the cutter pieces of rubber $z$, the effect of which construction is to permit the edge of the chisel to adjust itself on the face of the blank. The weight of the chisel alone will, up to a high rate of speed, cause it to drop upon the blank without the aid of the rubber springs $z\,z$, and the machine will therefore perform efficiently when these springs are not used. Consequently these springs are not absolutely essential to the proper working of my invention. There is a pin in the chisel and a groove in the carrier, which is widened at the top on one side, so that the chisel can, by manipulation on the part of the operator, be connected with and disconnected from the carrier, the pin connecting the chisel to the carrier, so that when the carrier is raised by its connection with the hammer-head the chisel will also be somewhat raised. The height of the enlarged part of the slot for the chisel-pin is greater than the diameter of said pin, so that the carrier can move toward the chisel-edge, merely compressing the rubber pieces $z$.

The operation of the parts immediately connected with the cutting of the file-teeth is as follows: Suppose the chisel adjusted in the carrier and this placed in the presser-bar, with projection $w$ locked into the piece $v$ and with the stout arm of lever $u$ closed against the carrier; and suppose that the hammer is as high as the tappets will raise it, in which case the carrier is at its highest position and the bottom of the slot in $v$ is in contact with the bottom of projection $w$. Now, when, by rotation of shaft $o$, the hammer falls from the tappet-point under influence of spring $g$ the chisel-edge, if raised off from the blank, will come in contact therewith by reason of the downward movement of the carrier, and the edge of the chisel will be pressed with the yielding pressure of the rubber springs $z\,z$ upon the blank till the projection $a'$ strikes the upper end of the chisel and forces its edge into the blank. It will be perceived that before the chisel gets a blow from the hammer its edge is adjusted fairly to the surface of the blank by the provision of the rubber springs $z$ and by the provision for movement of the chisel in the carrier. As the flat face of the chisel is supported against the nearly-vertical face of the presser, no spring or yield can occur to give false cuts in the blank; and as the chisel-edge bears fairly on the blank its edge is not broken in operating to cut. When the chisel is dulled the carrier can be removed and a new chisel placed therein, or the old one may be sharpened and replaced, all with the greatest facility.

To key the piece $v$ securely in the head, an incline or wedge provided with a nut and screw is used to operate against the side of said piece, as seen at $b'$, while to adjust said piece a similar wedge worked by a nut and screw is used over the top of piece $v$, as seen at $c'$, so that by simply turning the nuts referred to the necessary adjustments to compensate for wear in the chisel are made.

I claim—

1. The combination of the presser $p$, link $l$, and weighted foot-lever $s$, for the purpose of steadying and elevating the presser at will.

2. The combination of the carrier $x$, grooved and otherwise constructed as described, the chisel $y$, provided with the pin, as set forth, and with or without the rubber springs $z\ z$.

3. The combination of the carrier $x$ with the hammer by means of the slotted adjustable piece $v$, in the manner described.

4. The arrangement of the carrier within the recess in the end of the presser-lever and of the bent lever $u$, connected to said presser-lever and designed to confine said carrier within said recess, as described.

5. The combination of the carrier $x$ and chisel $y$, the pieces $v$ and $a'$, the adjustable wedges $b'$ and $c'$, and the hammer, all as and for the purposes set forth.

6. The combination of the moving pattern $f$, arm $j$, eccentric $i$, connection $k$, lever $l$, and screw $m$, for the purpose of automatically increasing and diminishing the tension of the spring $g$.

JAMES DODGE.

Witnesses:
GEO. WINRAM,
JAMES H. DAVIES.